(No Model.)

A. W. FORCE.
HORSE HAY RAKE.

No. 312,453. Patented Feb. 17, 1885.

Attest:
F. H. Schott
A. R. Brown

Inventor:
Albert W. Force
per J. C. Tasker
Atty.

UNITED STATES PATENT OFFICE.

ALBERT W. FORCE, OF ITHACA, NEW YORK, ASSIGNOR TO JOHN W. HALLENBACK, OF WILKES-BARRÉ, PENNSYLVANIA.

HORSE HAY-RAKE.

SPECIFICATION forming part of Letters Patent No. 312,453, dated February 17, 1885.

Application filed February 9, 1884. (No model.)

*To all whom it may concern:*

Be it known that I, ALBERT W. FORCE, a citizen of the United States, residing at Ithaca, in the county of Tompkins and State of New York, have invented certain new and useful Improvements in Horse Hay-Rakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in horse hay-rakes; and it consists in an attachment or bar hung to the ordinary rider-bar of a horse hay-rake and operated by the dumping mechanism, whereby the rake-teeth are given an additional lift, or raised higher than they would be by means of the dumping mechanism alone, so that their points will clear or pass over an unusually high or large windrow when raking heavy hay, as will be hereinafter more fully described, and then specifically pointed out in the claims.

Figure 1:
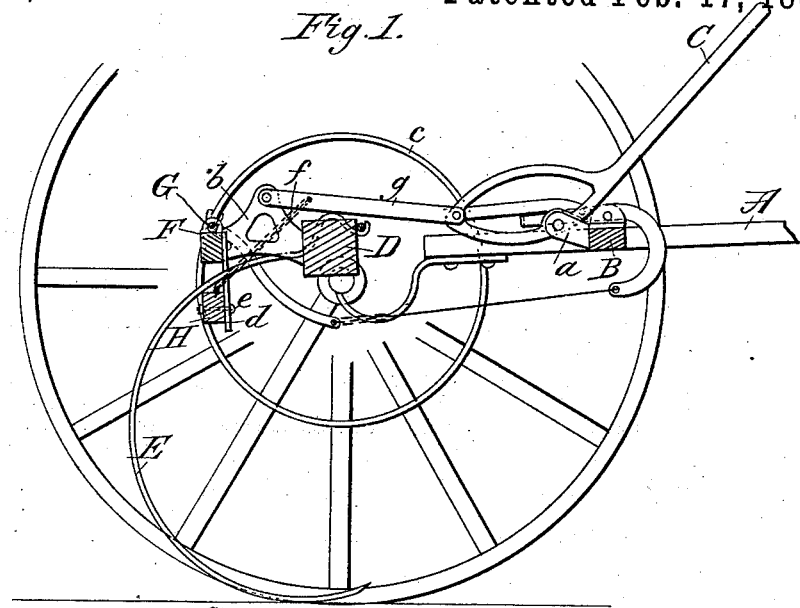
Figure 2:
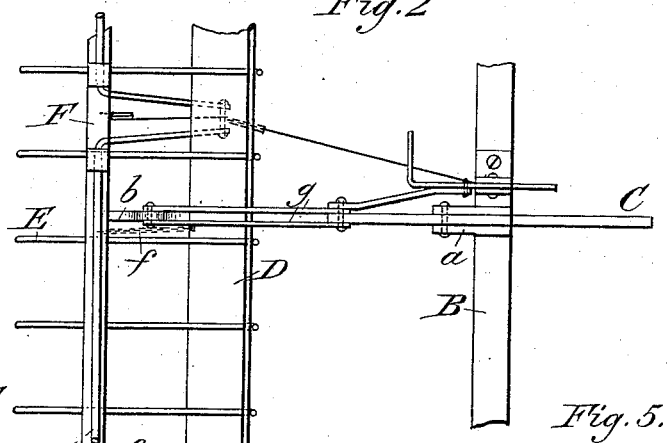
Figure 4:
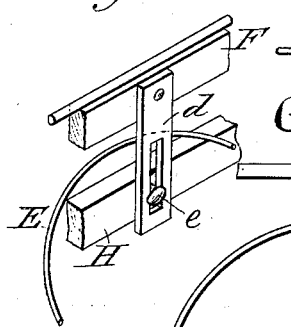
Figures 3, 5:
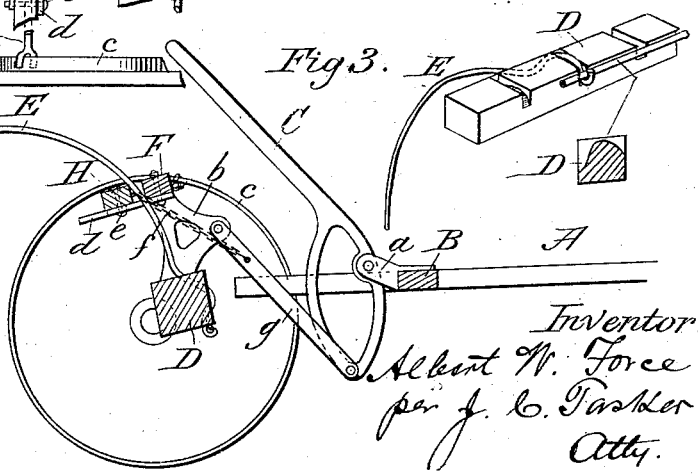

In the annexed drawings, which fully illustrate the invention, Figure 1 is a cross-section of a horse hay-rake with my improvement attached thereto. Fig. 2 is a plan view of Fig. 1, partly broken away. Fig. 3 is a cross-section showing the rake-teeth elevated by means of the lifting-bar. Fig. 4 is a detail perspective view showing the manner of hanging the teeth-lifting bar to the rider-bar; and Fig. 5 is a perspective view and section of a portion of the axle-bar or rake-head, showing the manner of attaching the rake-teeth.

The letter A represents the thill-frame of the rake, and B a cross-bar of the same. To the cross-bar B is secured a casting or lug, $a$, to which is pivoted a hand-lever, C, for operating the dumping mechanism of the rake. This dumping mechanism is similar to that shown in Patent No. 269,038 to A. W. Force, dated December 12, 1882, and need not be further described.

D represents the axle-bar or rake-head, to which the rake-teeth E are secured in the ordinary manner shown in the drawings. The rake-head is connected by means of a triangular plate, $b$, to the rider-bar F, as shown.

G G are cranked rock-shafts pivoted to the upper face of the rider-bar F, and provided at their outer ends with the usual forked irons for gripping the inner rims, $c\ c$, of the drive-wheel while dumping the rake. A teeth-lifting bar, H, of wood or other suitable material, is suspended under the rake-teeth E, and is fastened to the rider-bar F above by means of the slotted irons or straps $d$—two or more in number, as desired—which are bolted to the rider-bar, as shown in Fig. 4. This lifting-bar H extends entirely across the rake, under the upper portions of the rake-teeth, about three inches below the rider-bar F, and is provided with headed pins or bolts $e\ e$, each of which plays in the slot of its strap $d$ and completes the connection of the rider and teeth-lifting bars, as clearly shown in Fig. 4. The lifting-bar H is connected by a chain or rope, $f$, with the lever-connecting straps $g$. The object of the lifting-bar H is to pull up the rake-teeth against the rider-bar when the teeth E are being raised to dump the load, as shown in Fig. 3, thus enabling the points of the teeth to clear an unusually high or large windrow.

In dumping the rake the turning of the rake-head D and the forward movement of the connecting-straps $g$ take up the slack or shortens the chain $f$, thus pulling or lifting the bar H up against the rake-teeth E E, and forcing them up against or in contact with the under side of the rider-bar F, as shown in Fig. 3.

It will be observed that the rake-teeth E are hung or pivoted in slots in the upper face of the rake-head, as shown in Fig. 5, and in dumping would not come in contact with the rider-bar without the aid of the lifting-bar H. Thus the teeth are lifted higher than they would be by means of the dumping mechanism, enabling them to pass over an unusually large windrow. By disconnecting the chain $f$ the rake-teeth, when dumping, will not rise as high as the rider-bar, but their weight will keep them down upon the lifting-bar H, and the rake, when used in this way, will clear only ordinary windrows.

It is estimated that by raising the teeth a distance of three inches at the head by means of the lifting-bar H the points of the teeth will be raised about six inches higher than they would be if the said bar were not used. Of course the distance or space between the rake-teeth and rider-bar can be varied according to circumstances.

Having thus described my invention, what I claim as new, and desire to secure by Letters Patent, is—

1. In a horse hay-rake, the teeth-lifting bar H, connected to the rider-bar and dumping mechanism, whereby an additional lift can be given to the rake-teeth in passing large windrows, substantially as described.

2. In a horse hay-rake, the combination, with the rake-head, rake-teeth, and rider-bar, of a tooth-lifting bar and its actuating mechanism, substantially as shown and described.

3. In a horse hay-rake, the combination of the rake-head D, teeth E E, the rider-bar F, connecting-plate b, teeth-lifting bar H, slotted straps d d, chain f, the connecting-bar g, and lever C, substantially as shown and described.

In testimony whereof I affix my signature in presence of two witnesses.

ALBERT W. FORCE.

Witnesses:
   PETER H. PURSEL,
   M. N. TOMPKINS.